Sept. 15, 1959 P. RENAUT 2,903,886
APPARATUS FOR THE DETERMINATION OF THE EXISTENCE OR
NON-EXISTENCE AND THE QUALITY OF A BONDING
BETWEEN TWO PARTS OR MEMBERS
Filed Feb. 10, 1955

INVENTOR
PAUL RENAUT
BY
MICHAEL S STRIKER
ATTORNEY

United States Patent Office 2,903,886
Patented Sept. 15, 1959

2,903,886

APPARATUS FOR THE DETERMINATION OF THE EXISTENCE OR NON-EXISTENCE AND THE QUALITY OF A BONDING BETWEEN TWO PARTS OR MEMBERS

Paul Renaut, Saint-Maur, France, assignor to S.a.r.L. Realisations Ultrasoniques, Saint-Maur, France Application February 10, 1955, Serial No. 487,392

Claims priority, application France May 16, 1953

3 Claims. (Cl. 73—67.2)

The invention relates to a supersonic inspection apparatus, for inspecting and checking bonded materials, particularly metal bonded to metal and metal bonded to balsa, and more specifically in the case of members one side of which is inaccessible.

Supersonic resonance inspection methods are well known in the art, and utilized mainly for the determination of the thickness of metal bodies. According to said resonance inspection methods, frequency modulated supersonic vibrations are transmitted into the test body to determine the resonance frequencies of said vibrations therein, said resonance frequencies depending upon the thickness of said body, as disclosed for instance in United States Patent Number 2,522,924 filed July 3, 1946 (Branson), under the title "Supersonic Inspection Apparatus."

Furthermore, acoustic methods for inspecting and testing joints or bonds are described for instance in the United States Patent Number 2,605,633 filed July 23, 1946 (Gow), under the title: "Insulator Testing Apparatus." According to said methods, frequency modulated acoustic vibrations are transmitted through the test body, and the amplitude variations of the resonant peaks of the output detected signal indicate the quality of the joint.

The principles of above described methods differ from each other in that in the Branson method, there are measured the resonance frequencies of reflected supersonic echoes, said frequencies depending upon the thickness of the test body, whereas the Gow method is a "transparency" method, in which the mechanical vibrations are transmitted through the test body, the transmitting and receiving transducers being located at opposite faces of the test body, and furthermore, in which the amplitude of the resonant peaks of the output signals is measured, said amplitude depending upon the quality of the test joint.

According to my experience, the Branson method, applied to the checking of bonded solid materials comprising a plurality of layers, has not given satisfactory results in a number of cases, because of the fact that a variation of the resonant frequencies due to the presence of delaminated parts in the assembly is often small. The Gow method did not prove better, because of the many drawbacks of "transparency" supersonic inspection methods, much less sensitive than resonance methods.

Moreover none of the available supersonic inspection apparatus had been designed for the particular purpose of checking assemblies of bonded solid parts with sufficient sensitivity, and of automatic directly readable indication.

Thus it is one object of the invention to provide an apparatus adapted to combine the advantages of the two above mentioned methods, and to apply these methods to the inspection or checking of bonded solid materials comprising two or more layers bonded with cement or glue.

It is another object of the invention to provide an accurate and dependable direct reading automatic inspection apparatus for checking bonded solid materials comprising two or more layers bonded together with cement or glue.

A more specific object of the invention is to provide an accurate and dependable apparatus for checking bonded parts, and metal and balsa bonded parts in aircraft and the like.

It has been found that the fundamental resonant frequency of the assembly of two metal plates laid one over the other without being bonded, with respect to an exploring beam of supersonic vibrations, is substantially the same as the resonant frequency of the upper plate, through which the beam is propagated first. The amplitude peak of the received reflected supersonic vibrations for said resonant frequency is very sharp. However, if there is a thin layer of glue, or other bonding composition, between the two metal plates, the resonant frequency of the assembly is slightly modified. On the other hand, because of the high power of absorption characteristic of the bonding composition, said amplitude peak is much less sharp than that corresponding to an assembly in which the plates are not bonded, or are no longer bonded due to delamination.

It has been found that, in the particular case of metallic bonded parts, or metal and balsa bonded parts, constituting, for instance, the fuselage of an aircraft, though a "transparency" or a "reflection" method based upon the measurement of amplitude variations of fixed frequency waves, or a method based upon the measurement of reflected supersonic variable frequency vibrations, should theoretically have been successful, the only general method adapted to give practical good results consists, as established by invention, in measuring the amplitude variations of the resonant peaks of a reflected frequency modulated supersonic wave.

Moreover, probably because of parasitic resonances at frequencies which may occur between the successive harmonic resonant frequencies of the supersonic wave in the test assembly of bonded parts, an apparatus designed according to said general method is often liable to errors, and may indicate erroneously the presence of delaminated parts: this is a very serious drawback, particularly if a dependable-automatic-control device is sought for.

Therefore, the automatic inspection device for bonded parts according to the invention comprises an oscillator comprising a tuned plate circuit; an electromechanical transducer connected across said plate circuit and adapted to transmit supersonic vibrations to said assembly and to receive back reflections therefrom; means for modulating the frequency of said oscillator until it coincides with one of the resonant frequencies of said vibrations in said assembly, the mean frequency of the frequency modulated wave, and its frequency deviation being selected in such a way that the range of frequency variations of said wave includes only one of said resonant frequencies; filter means connected in said plate circuit for transmitting the variations of the plate current of said oscillator; a threshold device responsive to the portion of said variations which is included between two predetermined levels of amplitude; and indicating means responsive to said portion of said variations.

According to a preferred embodiment, particularly adapted for the inspection of an assembly consisting of a metal plate bonded to balsa, the limited range of frequency variations of the exploring wave include one of the resonant frequencies of delaminated parts of the assembly. Then, in the course of the inspection, a signal appears on the indicator for the delaminated parts of the explored assembly, and disappears for the bonded parts.

This embodiment is particularly sensitive, and is to be used in the numerous cases when to the bonded parts there corresponds a very feeble peak of resonance in the amplitude of the reflected beam (because of absorption of transverse supersonic waves in the bonded assembly). In such cases, though pure non-modulated supersonic waves, or amplitude modulated waves of adjustable frequency could theoretically be used, in fact, because the amplitude of the reflected beam is considerably reduced in the bonded parts of the assembly, the use of frequency modulated waves has proved to give far better results, and is preferable, particularly in an automatic direct reading device.

In arrangements according to the invention, there may be used a transmitting piezo-electric crystal, and a receiving piezo-electric crystal, one independant from the other, or on the other hand, both transmitter and receiver may be combined into a single transducer. A complete understanding of the invention may be gained from consideration of the following detailed description, and the accompanying drawings, in which.

Figure 1:
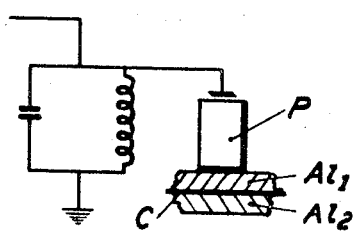
Fig. 1 is a general diagram of a supersonic inspection apparatus.

In Fig. 1, in parallel with an oscillating LC circuit there is provided a piezo-electric transducer P, in intimate contact with the surface of the inspected assembly comprising two aluminum plates $Al_1$ and $Al_2$, bonded together by means of a layer of glue C. Assuming that $v_1$ and $v_2$ are the respective propagation velocities of supersonic vibrations in the piezo-electric material and in aluminum, respectively, the resonant frequencies of the assembly comprising the piezo-electric plate P, the thickness of which is $E_1$ and the plate $Al_1$, the thickness of which is $E_2$, are determined by the formula:

$$F_n = n\left[\frac{v_1}{E_1} + \frac{v_2}{E_2}\right]$$

$n$ being an integer.

Figure 2:
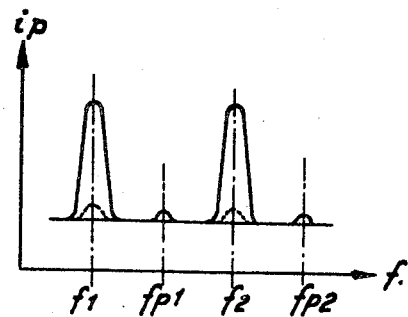
Fig. 2 shows a curve of the variations, versus frequency, of the average plate current in the oscillating circuit of Fig. 1.

In the case of the assembly illustrated by Fig 1, it has been found that the presence of a second bonded aluminum plate $Al_2$ introduces but a slight change in the resonant frequency $F_n$. In this case, the principal change is observed in the amplitude of the resonant peak of the plate current Lip, as shown in Fig. 2, in which $f_1$ is the fundamental resonant frequency, $f_2$, $f_3$, etc. would be the successive harmonics of said resonant frequency, for $n=2$; $n=3$, etc.

In Fig. 2, $fp_1$, $fp_2$, etc are small parasitic resonances; the full line curves correspond to a non-bonded or delaminated member, whereas the dotted line curves correspond to bonded members where the dampening or absorption effect of the glue layer C reduces the amplitudes.

Figure 3:
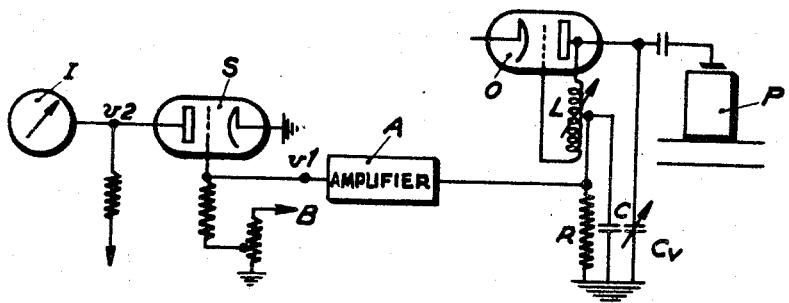
Fig. 3 is a circuit diagram of an apparatus according to the invention.

In Fig. 3, illustrating an embodiment of the invention, the oscillating tube O has, in a non-limiting example, a medium frequency of oscillation adjustable between 1 and 4.5 mcs., by means of the variable inductance L, consisting of an adjustable ferro-magnetic pot.

The use of a variable potted inductor leads to very reduced stray capacities and provides a good Q factor for the oscillating circuit.

The frequency deviation can be adjusted from 5% up to 15%, and is obtained by means of a rotating capacitor $C_v$. The apparatus may be operated either at the fundamental resonant frequency of the inspected assembly, or at an harmonic of said frequency, advantageously the third harmonic. The fundamental resonant frequency of the transducer P, is, in the particular example now described, 5 mcs.

The resistor R, by-passed for the high frequencies by the capacitor C, transmitts but the low frequency variations of the plate current of the tube O about its average value.

Figure 4:
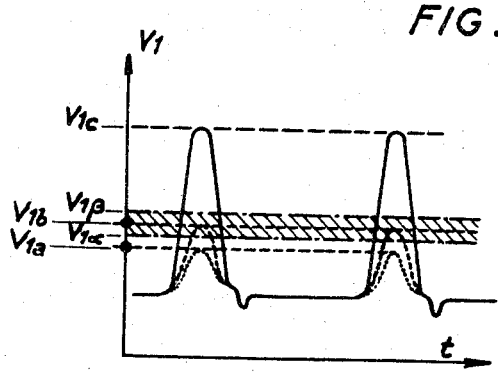
Figs. 4 and 5 are illustrative of the operation of the apparatus shown in Fig. 3.

At the output of the amplifier A, said variations have the wave form shown in Fig. 4, in dotted line for well bonded members, in interrupted line for slightly delaminated members, and in full line for completely delaminated members.

Figure 5:
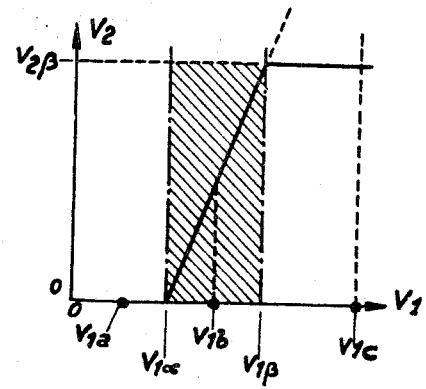

The output voltage $V_1$ of amplifier A is fed to a threshold device or "slicer" S, which is operated only by voltages $V_1$ included between two limits $V_{1a}$ and $V_{1\beta}$ (Figs. 4 and 5).

As is shown in Fig. 5, when a voltage inferior or equal to $V_{1a}$ is applied at the input of threshold device S, no output voltage $V_2$ is obtained. When a voltage equal or superior to $V_{1\beta}$ is applied at the input of the threshold device S, a voltage equal to $V_{2\beta}$ is obtained at its output. For an input voltage comprised between $V_{1a}$ and $V_{1\beta}$, output voltages $V_2$ ranging between 0 and $V_{2\beta}$ are obtained. Said output voltages $V_2$ are fed to indicator 1, which is responsive to voltages ranging from 0 to $V_{2\beta}$.

For well bonded members, the input $V_{1a}$ being (see Fig. 4) inferior to the minimum operating level $V_{1a}$ of the threshold device S, no indication appears on the indicator I. For completely delaminated members, the input $V_{1c}$ (Fig. 4) being superior to the maximum operating level $V_{1\beta}$ of the slicer, the maximum deflection of index of indicator I is obtained. For more or less partially delaminated members, the input $V_{1b}$ is included within the operating range of the threshold device. By an appropriate adjustment of the biasing voltage B of the threshold device S, said operating range can be adjusted to match the graduation of the indicator, for each type of assembly to be inspected, so that an immediate automatic reading of the quality of the bond can be obtained. It is remarked that in the case of a metal weld, a "change" in amplitude of the plate current from the oscillator would also result from differences in the degree of bonding between the parts. In this case, this change should not be due to a variation in the attenuation of the vibrations by the weld, but to a shift of the resonant frequency which depends upon the degree of bonding. However, whatever be their cause, the amplitude variations at the output of the oscillator will be transmitted to the threshold device, and the apparatus will operate in the same way as in the above described example.

What I claim is:

1. Supersonic automatic inspection device for determining the existence or non-existence and the quality of a bonding in an assembly of bonded parts, comprising, in combination: a vacuum tube frequency modulated oscillator comprising a tuned plate circuit; electromechanical transducer means connected across said plate circuit and adapted to transmit supersonic vibrations to said assembly and to receive back reflections therefrom; means for modulating the frequency of said oscillator until it coincides with one of the resonant frequencies of said vibrations in said assembly, the frequency deviation being predetermined so that only one of said resonant frequencies may be included within the limits of the frequency deviation; filter means connected in said plate circuit for transmitting the variations of the plate current of said oscillator; and a threshold device responsive to the portion of said variations which is included between two predetermined levels of amplitude; and indicating means responsive to said portion, said threshold device connecting said indicating means to said filter means.

2. A supersonic device, for determining the existence or non-existence and the quality of a bonding in an assembly of bonded parts, comprising, in combination: an oscillator having an output circuit; electromechanical transducer means connected across said output circuit and adapted to transmit supersonic vibrations to said assembly and to receive back reflections therefrom; means for modulating the frequency of said oscillator within a frequency range including only one of the resonant frequencies of said vibrations in improperly bonded parts; filter means, inserted in said plate circuit, for transmitting the variations of the plate current of said oscillator; a threshold device, responsive to the portion of said variations included between two predetermined levels of amplitude; and indicating means, responsive to said portion, said threshold device connecting said indicating means to said filter means, and said indicating means being graduated so as to directly indicate the quality of the bonding, the maximum indication corresponding to improperly bonded portions, whereas the minimum indication corresponds to properly bonded portions.

3. A supersonic device, for determining the existence or non-existence and the quality of a bonding in an assembly of bonded parts, comprising, in combination: an oscillator having an output circuit; electromechanical transducer means connected across said output circuit and adapted to transmit supersonic vibration to said assembly and to receive back reflections therefrom; means for modulating the frequency of said oscillator within a frequency range including only one of the resonant frequencies of said vibrations in improperly bonded parts; filter means, inserted in said plate circuit, for transmitting the variations of the plate current of said oscillator; a threshold device, responsive to the portion of said variations included between two predetermined levels of amplitude; and indicating means, responsive to said portion, said threshold device connecting said indicating means to said filter means, and said indicating means being graduated so as to directly indicate the quality of the bonding, the maximum indication corresponding to improperly bonded portions, whereas the minimum indication corresponds to properly bonded portions, said inspection device further comprising means for adjusting said two predetermined amplitudes of the threshold device.

References Cited in the file of this patent
UNITED STATES PATENTS

| | | |
|---|---|---|
| 2,522,924 | Branson | Sept. 19, 1950 |
| 2,605,633 | Gow | Aug. 5, 1952 |
| 2,635,746 | Gordon | Apr. 21, 1953 |
| 2,682,767 | Henry | July 6, 1954 |

FOREIGN PATENTS

| | | |
|---|---|---|
| 899,646 | France | Aug. 28, 1944 |